June 28, 1960   W. E. DISNEY ET AL   2,942,516
PANORAMIC MOTION PICTURE PRESENTATION ARRANGEMENT
Filed July 17, 1956   2 Sheets-Sheet 1

INVENTORS.
WALTER E. DISNEY.
UB IWERKS.
BY Fulwider, Mattingly
and Huntley
ATTORNEYS.

June 28, 1960 W. E. DISNEY ET AL 2,942,516
PANORAMIC MOTION PICTURE PRESENTATION ARRANGEMENT
Filed July 17, 1956 2 Sheets-Sheet 2

INVENTORS
WALTER E. DISNEY.
UB, IWERKS.
BY Fulwider, Mattingly
and Huntley
ATTORNEYS.

United States Patent Office 2,942,516
Patented June 28, 1960

2,942,516

PANORAMIC MOTION PICTURE PRESENTATION ARRANGEMENT

Walter E. Disney, Los Angeles, and Ub Iwerks, Sherman Oaks, Calif., assignors, by mesne assignments, to Walt Disney Productions, Burbank, Calif., a corporation of California Filed July 17, 1956, Ser. No. 598,451

7 Claims. (Cl. 88—16.6)

The present invention relates generally to motion picture projection and more particularly to a film projection apparatus providing a continuous picture on a circular screen.

It has been heretofore proposed to provide a continuous motion picture covering a circular field of 360 degrees. In such heretofore-proposed apparatus a plurality of screens are arranged in a circle with the audience being located within the space encompassed by the screens. A projector is provided for each screen and the resulting plurality of projectors are disposed centrally of the screens. This central positioning of the projectors and projectionist seriously limits the amount of space available for receiving an audience. Moreover, the space occupied by these projectors at the center of the screens is the optimum location for viewing the picture. The location of the projectors at the center of the viewing area also constitutes a serious source of disturbance to the audience because of the noise, light and heat attendant to the operation of the projectors.

It is a major object of the present invention to provide new and novel film projecting apparatus for obtaining a continuous picture having a circular field.

A more particular object is to provide film projection apparatus of the aforedescribed nature wherein the film projectors are completely removed from the viewing area of the audience. This arrangement provides a maximum viewing area and additionally permits the noise, light and heat from the projectors to be isolated from the audience.

An important object of the invention is to provide film projection apparatus of the aforedescribed nature wherein the projectionist is provided with adequate room and illumination for effectively servicing and operating the projectors.

A further object is to provide film projection apparatus of the aforedescribed nature which requires a minimum amount of space for its installation and which can accommodate a maximum audience for a given viewing area.

Yet another object of the invention is to provide film projection apparatus of the aforedescribed nature which affords an audience a maximum amount of realism.

An additional object of the invention is to provide film projection apparatus of the aforedescribed nature wherein the distortion of the picture is maintained at a minimum.

It is yet a further object to provide film projection apparatus of the aforedescribed nature wherein no special means are required to prevent overlap between adjoining screens.

These and other objects and advantages of the present invention will become apparent from the following detailed description, when taken in conjunction with the appended drawings, wherein.

Figure 1:
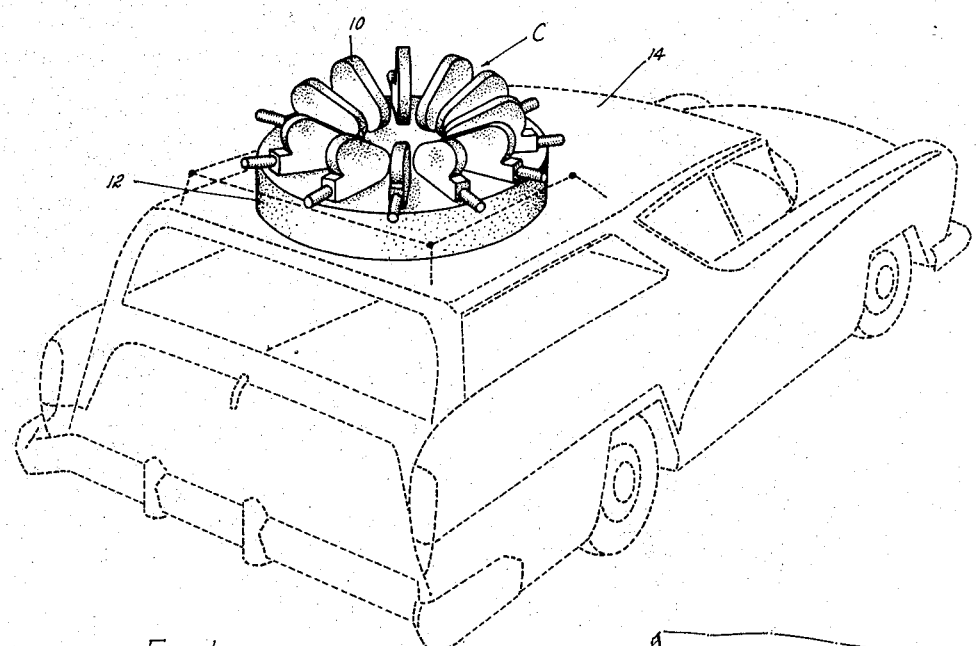
Figure 1 is a perspective view of camera apparatus which may be employed to take the films utilized with the film projection apparatus of the present invention.
Figure 2:
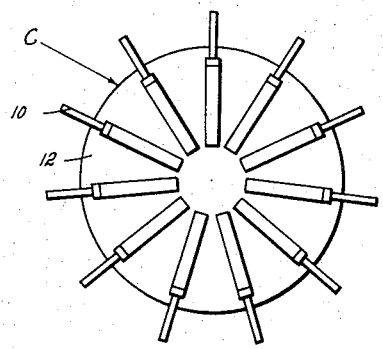
Figure 2 is a top plan view of said camera apparatus.

Referring to the drawings and particularly Figures 1 and 2 thereof, there is shown suitable camera apparatus C for taking the films utilized with the preferred form of film projection apparatus embodying the present invention. This camera apparatus C incorporates a plurality of conventional motion picture cameras 10 secured to a circular housing 12. The housing 12 is affixed to the upper portion of an automotive vehicle 14. The cameras 10 are equi-distantly spaced from one another with their optical axes extending radially outwardly relative to the housing 12. The film driving mechanisms of the cameras are synchronized so that at any instant the camera assembly is photographing 360 degrees of picture. Thus, as the automotive vehicle 14 is driven along a roadway, the cameras will collectively photograph the entire area surrounding the vehicle. Although the camera apparatus C is shown mounted on an automotive vehicle, it may readily be carried by other types of conveyances, as for example, boats, aircraft, trains and the like.

Figure 4:
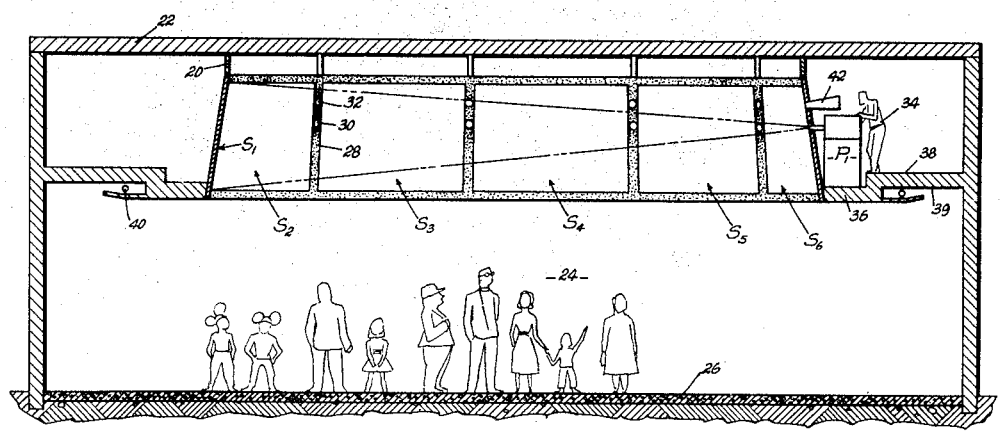
Figure 4 is a vertical sectional view taken along lines 4—4 of Figure 3.

Referring now to the remaining figures, the preferred form of film projection apparatus embodying the present invention includes a plurality of conventional substantially flat film projection screen $S_1$, $S_2$, $S_3$, etc., which collectively define a circular field. As indicated in Figure 4, the screens may be affixed to a framework 20 which is suspended from the roof supports 22 of the building that houses the apparatus. An audience-receiving area 24 is disposed below the screens with the audience standing or sitting within the area encompassed by the screens. The floor 26 of the audience-receiving area 24 should be so spaced relative to the screens that the eye level of the members of the audience will be below the lower edges of the screens. Where the audience is to be seated, swivel chairs (not shown) may be provided.

Each of the screens $S_1$, $S_2$, $S_3$, etc. is separated from its adjoining screen by a non-light reflecting strip 28. Each of these strips 28 is formed with a lower opening 30 and a film projector $P_1$, $P_2$, $P_3$, etc. has its lens aligned with this opening. Each of the strips 28 is also provided with an upper opening 32 that serves as an observation window for the projectionist 34.

The projectors $P_1$, $P_2$, $P_3$, etc. are each supported on a ring-like horizontal partition 36 aligned with the lower edge of the screen framework 20. A walkway 38 is provided for the projectionist 34. This walkway 38 encompasses the partition 36 and is raised thereabove. The underside of the partition 36 and the walkway 38 constitutes a false ceiling 39 which cooperates with the screens in completely shielding the projectors and the projectionist from the view of the audience. The audience-receiving area 24 may be illuminated by indirect lighting fixtures 40 disposed concentrically of the partition 36. Suitable sound reproducing means (not shown) may also be provided for accompanying the picture.

Figure 3:
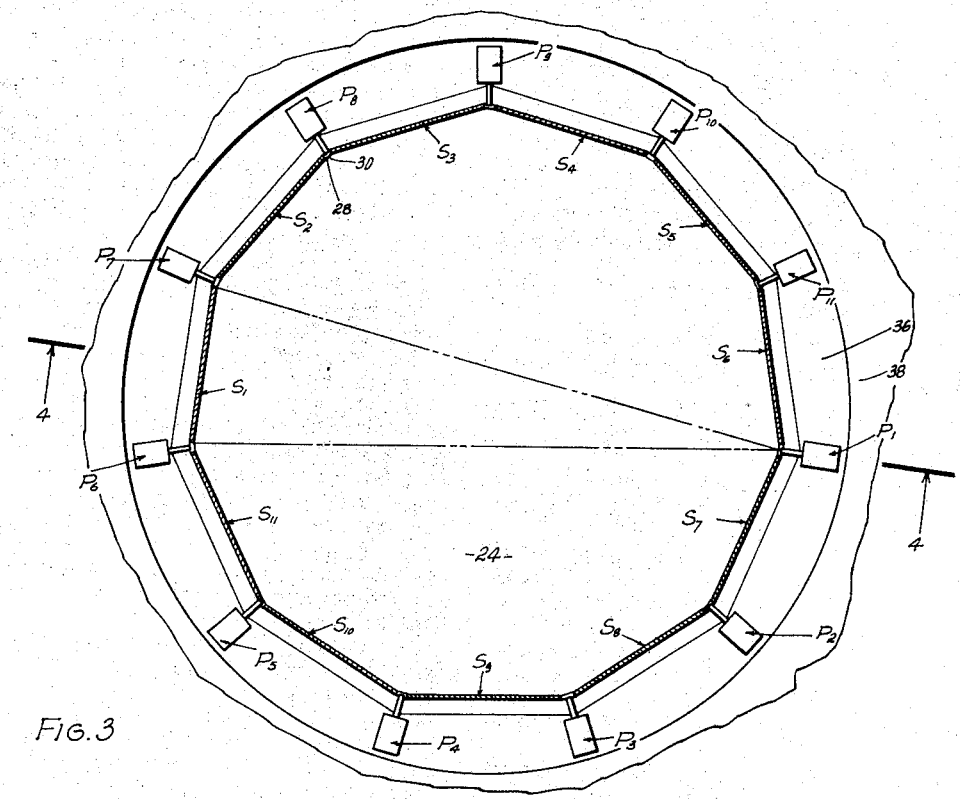
Figure 3 is a plan view of a preferred form of film projection apparatus embodying the present invention.

As indicated in Figures 3 and 4, each projector is adapted to project a picture across the top of the audience-receiving area 24 to the screen disposed substantially diametrically opposite its location. Thus, the projector $P_1$ projects its picture upon the screen $S_1$, projector $P_2$ projects its picture upon the screen $S_2$ and so forth. The number of projectors and screens corresponds to the number of cameras 10 shown in Figures 1 and 2 and each projector receives the film taken by one of them. The projectors will be operated synchronously so as to provide a continuous picture having a circular field.

Preferably, the screens $S_1$, $S_2$, $S_3$, etc. will be inclined to the vertical with their upper edges spaced radially inwardly relative to their lower edges. With this arrangement, the line of sight of a member of the audience will more closely approximate a right angle than if the screens were arranged absolutely vertical. Less distortion of the picture will result.

Figure 5:
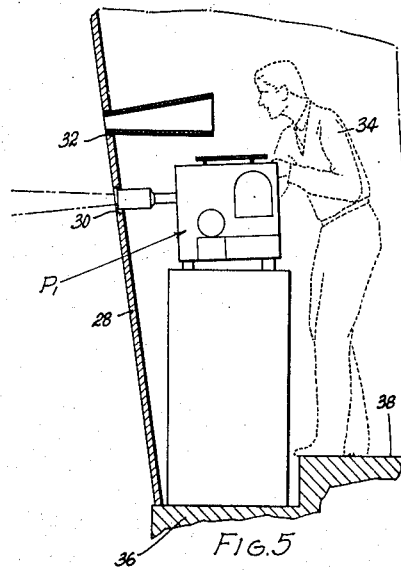
Figure 5 is an enlarged view of one of the film projectors shown in Figure 4.

As noted hereinabove, and with particular regard to Figures 4 and 5, the projectors, as well as the projectionist 34, are at all times hidden from the view of the audience. Accordingly, noise, light and heat inherent to the operation of these projectors will be isolated from the audience. To this end, suitable insulating material (not shown) may be arranged rearwardly of the screens. Preferably, a light shielding hood 42 will be provided for the observation window 32. Since the projectionist is at all times invisible to the audience, he may service and operate the projectors without disturbing them. Moreover, he is assured adequate illuminated working space for efficiently carrying out his duties.

The use of the non-light reflecting strips 28 between each of the screens eliminates the necessity of providing special means to prevent overlap between adjoining pictures, such strips providing definite lines of discontinuity therebetween. When viewing the continuous picture, an observer is given the impression that he is in a multi-windowed vehicle, the dark vertical lines provided by the strips 28 resembling window stiles. A realistic feeling of motion results.

While eleven projectors and screens are shown in the accompanying drawings, a greater or lesser number may be employed. It is desirable to utilize an odd number, however, since each projector will then be disposed normal to its corresponding screen. This results in a minimum of picture distortion.

Although there has been shown and described hereinabove what is presently considered to be the preferred embodiment of the present invention, it will be apparent that various modifications and changes may be made thereto without departing from the spirit of the invention or the scope of the following claims.

We claim:

1. A panoramic motion picture presentation arrangement, comprising: an odd-numbered plurality of substantially flat screens of equal size, said screens each being inclined to the vertical with its upper edge spaced radially inwardly relative to its lower edge so as to define a substantially frusto-conical field; a non-light reflecting strip separating each of said screens; an audience-receiving area disposed below said screens and encompassed thereby with the eye level of the audience below the lower edge of said screens; an opening formed in each of said strips; and a plurality of film projectors, one of said projectors being aligned with and disposed behind each of said openings so as to project a picture upon the screen substantially diametrically opposite the location of each said projector whereby said projectors may collectively project a single panoramic picture on said screens that is continuous except for the spaces occupied by said strips.

2. A panoramic motion picture presentation arrangement, comprising: an odd-numbered plurality of substantially flat screens of equal size, said screens each being inclined to the vertical with its upper edge spaced radially inwardly relative to its lower edge so as to define a substantially frusto-conical field; a non-light reflecting strip separating each of said screens; an audience-receiving area disposed below said screens and encompassed thereby with the eye level of the audience being below the lower edge of said screens; a horizontal partition extending outwardly from the lower portion of said screens; a walkway encompassing said partition, said partition and walkway defining a false ceiling for said audience-receiving area; an opening formed in each of said strips; and a plurality of film projectors supported upon said partition, one of said projectors being aligned with and disposed behind each of said openings so as to project a picture upon the screen diametrically opposite the location of each said projector whereby said projectors may collectively project a single panoramic picture upon said screens that is continuous except for the spaces occupied by said strips.

3. A panoramic motion picture presentation arrangement, comprising: an odd-numbered plurality of substantially flat screens of substantially equal size, collectively defining a substantially cylindrical field; a generally vertically extending non-light reflecting strip separating the proximate edges of each of said screens; an audience-receiving area disposed below said screens and encompassed thereby, with the eye level of the audience being below the lower edge of said screens; an opening formed in each of said strips; and a plurality of film projectors corresponding to the number of said screens and strips, one of said projectors being aligned with and disposed behind each of said openings so as to project a picture upon the screen substantially diametrically opposite the location of each said projector whereby said projectors may collectively project a single panoramic picture on said screens that is continuous except for the spaces occupied by said strips.

4. A panoramic motion picture presentation arrangement, comprising: an odd-numbered plurality of substantially flat screens of substantially equal size collectively defining a substantially cylindrical field; a generally vertically extending non-light reflecting strip separating the proximate edges of each of said screens; an audience-receiving area disposed below said screens and encompassed thereby, with the eye level of the audience being below the lower edge of said screens; and a plurality of film projectors corresponding to the number of said screens and strips, each of said projectors when viewed in plan being disposed diametrically opposite the screen upon which it may directly project and immediately radially outwardly of the plane of its corresponding strip, each of said projectors being disposed above the lower portion of its corresponding strip whereby said projectors may collectively project a single panoramic picture on said screens that is continuous except for the spaces occupied by said strips.

5. A panoramic motion picture presentation arrangement, comprising: an odd-numbered plurality of substantially flat screens of substantially equal size, said screens each being inclined to the vertical with its upper edge spaced radially inwardly relative to its lower edge so as to define a substantially frusto-conical field; a generally vertically extending non-light reflecting strip separating the proximate edges of each of said screens; an audience-receiving area disposed below said screens and encompassed thereby, with the eye level of the audience being below the lower edge of said screens; and a plurality of projectors corresponding to the number of said screens and strips, each of said projectors when viewed in plan being disposed diametrically opposite the screen upon which it may directly project and immediately radially outwardly of the plane of its corresponding strip, each of said projectors being disposed above the lower portion of its corresponding strip whereby said projectors may collectively project a single panoramic picture on said screens that is continuous except for the spaces occupied by said strips.

6. A panoramic motion picture presentation arrangement, comprising: an odd-numbered plurality of substantially flat screens of substantially equal size, collectively defining a substantially cylindrical field; a generally vertically extending non-light reflecting strip separating the proximate edges of each of said screens; an audience-receiving area disposed below said screens and encompassed thereby, with the eye level of the audience being below the lower edge of said screens; a horizontal partition extending outwardly from the lower portion of said screens; a walkway encompassing said partition, said partition and walkway defining a false ceiling for said audience-receiving area; an opening formed in each of said strips; and a plurality of film projectors supported upon said partition, one of said projectors being aligned with and disposed behind each of said openings so as to project a picture upon the screen diametrically opposite the location of each said projector whereby said projectors may collectively project a single panoramic picture upon said screens that is continuous except for the spaces occupied by said strips.

7. A panoramic motion picture presentation arrangement, comprising: an odd-numbered plurality of substantially flat screens of substantially equal size, collectively defining a substantially cylindrical field; a generally vertically extending non-light reflecting strip separating the proximate edges of each of said screens; an audience-receiving area disposed below said screens and encompassed thereby, with the eye level of the audience being below the lower edge of said screens; a horizontal partition extending outwardly from the lower portion of said screens; a walkway encompassing said partition, said partition and walkway defining a false ceiling for said audience-receiving area; and a plurality of projectors corresponding to the number of said screens and strips, each of said projectors when viewed in plan being disposed diametrically opposite the screen upon which it may directly project and immediately radially outwardly of the plane of its corresponding strip, each of said projectors being disposed above the lower portion of its corresponding strip whereby said projectors may collectively project a single panoramic picture on said screens that is continuous except for the spaces occupied by said strips.

References Cited in the file of this patent

UNITED STATES PATENTS

| | | |
|---|---|---|
| 1,957,947 | Dreyfuss | May 8, 1934 |
| 2,280,206 | Waller et al. | Apr. 21, 1942 |

FOREIGN PATENTS

| | | |
|---|---|---|
| 16,326 | Great Britain | 1894 |
| 23,396 | Great Britain | 1907 |
| 11,048 | Great Britain | 1913 |
| 650,461 | Great Britain | Feb. 28, 1951 |
| 61,859 | Austria | Oct. 25, 1913 |
| 383,073 | France | Dec. 27, 1907 |